United States Patent
Haruki et al.

(10) Patent No.: US 10,521,320 B2
(45) Date of Patent: Dec. 31, 2019

(54) INFORMATION PROCESSING DEVICE, INFORMATION PROCESSING METHOD AND COMPUTER PROGRAM PRODUCT

(71) Applicant: KABUSHIKI KAISHA TOSHIBA, Minato-ku (JP)

(72) Inventors: Hiroyoshi Haruki, Kawasaki (JP); Fukutomo Nakanishi, Sumida (JP); Fangming Zhao, Fuchu (JP); Satoshi Aoki, Fuchu (JP); Tatsuyuki Matsushita, Nerima (JP); Toshinari Takahashi, Ota (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 335 days.

(21) Appl. No.: 15/390,984

(22) Filed: Dec. 27, 2016

(65) Prior Publication Data

US 2017/0270020 A1    Sep. 21, 2017

(30) Foreign Application Priority Data

Mar. 18, 2016   (JP) ................. 2016-056209

(51) Int. Cl.
| | | |
|---|---|---|
| *G06F 11/273* | (2006.01) | |
| *G06F 11/27* | (2006.01) | |
| *H04L 9/12* | (2006.01) | |
| *G06F 11/263* | (2006.01) | |

(52) U.S. Cl.
CPC .......... *G06F 11/2733* (2013.01); *G06F 11/27* (2013.01); *H04L 9/12* (2013.01)

(58) Field of Classification Search
CPC .... G06F 11/2733; G06F 11/263; G06F 11/27; G06F 11/25–27; H04L 9/12
USPC ...................................................... 380/29, 28
See application file for complete search history.

(56) References Cited

U.S. PATENT DOCUMENTS

| | | | | |
|---|---|---|---|---|
| 4,695,946 A | * | 9/1987 | Andreasen | G06F 11/00 714/31 |
| 5,442,643 A | * | 8/1995 | Adachi | G06F 11/2733 714/724 |
| 7,606,695 B1 | * | 10/2009 | Nouri | G06F 17/5022 702/121 |
| 8,539,449 B2 | | 9/2013 | Kim et al. | |

(Continued)

FOREIGN PATENT DOCUMENTS

| | | |
|---|---|---|
| JP | 2008-65687 A1 | 3/2008 |
| JP | 2009-116847 A | 5/2009 |

(Continued)

*Primary Examiner* — Kambiz Zand
*Assistant Examiner* — Mahabub S Ahmed
(74) *Attorney, Agent, or Firm* — Oblon, McClelland, Maier & Neustadt, L.L.P.

(57) ABSTRACT

According to an embodiment, an information processing device includes a processor. The processor is configured to: execute a rewriting process to rewrite some of a plurality of factors, included in data for normal operation of a target device, into a value different from a normal value; execute a correction process that is performed in a course of generating test data to be used for a test of the target device; and determine a method of generating the test data based on a rewriting part that indicates a factor serving as a target of the rewriting process and based on a correction part that indicates a factor serving as a target of the correction process.

11 Claims, 15 Drawing Sheets

(56) References Cited

U.S. PATENT DOCUMENTS

| | | | |
|---|---|---|---|
| 2002/0184592 A1* | 12/2002 | Koga | G06F 11/1032 714/763 |
| 2003/0043663 A1* | 3/2003 | Haraguchi | G11C 7/1006 365/201 |
| 2004/0268181 A1* | 12/2004 | Wang | G01R 31/318586 714/30 |
| 2006/0052962 A1* | 3/2006 | Shipton | B41J 2/04505 702/106 |
| 2006/0143454 A1* | 6/2006 | Walmsley | G06F 21/85 713/170 |
| 2006/0294312 A1* | 12/2006 | Walmsley | H04L 9/0662 711/122 |
| 2007/0083491 A1* | 4/2007 | Walmsley | G06F 21/608 |
| 2007/0203973 A1 | 8/2007 | Landauer et al. | |
| 2008/0092239 A1* | 4/2008 | Sitrick | G06F 21/10 726/27 |
| 2011/0055777 A1* | 3/2011 | Tremaine | G06F 11/263 716/106 |
| 2011/0131459 A1* | 6/2011 | Tu | G06F 11/1068 714/746 |
| 2012/0257461 A1* | 10/2012 | Kim | G11C 29/022 365/189.05 |
| 2013/0326263 A1* | 12/2013 | Alameldeen | G06F 11/1048 714/6.2 |
| 2014/0025983 A1* | 1/2014 | Usui | G06F 11/0793 714/2 |
| 2014/0281350 A1* | 9/2014 | Lango | G06F 3/0665 711/203 |
| 2014/0372791 A1* | 12/2014 | Adachi | G06F 13/1689 714/5.1 |
| 2015/0207629 A1* | 7/2015 | Oshida | H04L 9/3278 380/28 |
| 2016/0292059 A1* | 10/2016 | Catherwood | G06F 11/10 |
| 2017/0075784 A1 | 3/2017 | Nakanishi et al. | |
| 2017/0270033 A1 | 9/2017 | Aoki et al. | |
| 2019/0072611 A1* | 3/2019 | Shibahara | G01R 31/3177 |

FOREIGN PATENT DOCUMENTS

| | | |
|---|---|---|
| JP | 2017-58838 A | 3/2017 |
| JP | 2017-167937 A | 9/2017 |
| JP | 2017-167984 A | 9/2017 |
| JP | 2017-169147 A | 9/2017 |

* cited by examiner

FIG.22
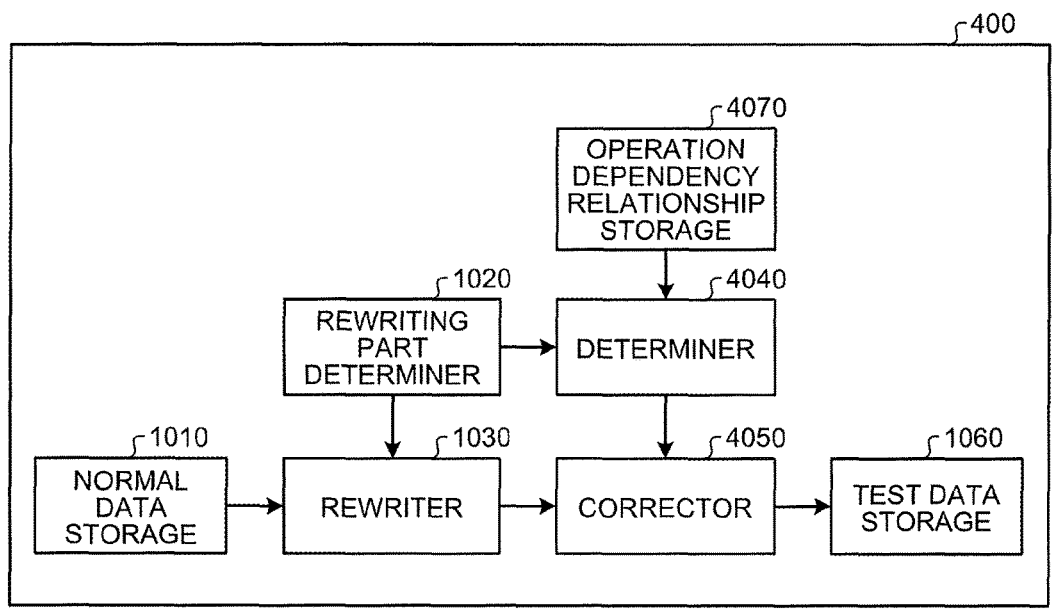
FIG.23
| DEPENDENCY SOURCE FACTOR | DEPENDENCY DESTINATION FACTOR | OPERATION METHOD |
|---|---|---|
| B | C | E{⋯} |
| C | D | H{⋯} |
4800
FIG.24
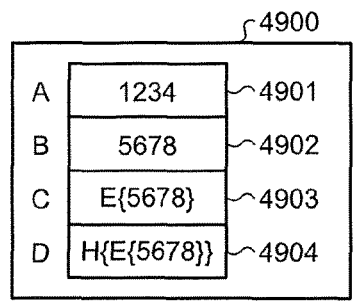

INFORMATION PROCESSING DEVICE, INFORMATION PROCESSING METHOD AND COMPUTER PROGRAM PRODUCT

CROSS-REFERENCE TO RELATED APPLICATION

This application is based upon and claims the benefit of priority from Japanese Patent Application No. 2016-056209, filed on Mar. 18, 2016; the entire contents of which are incorporated herein by reference.

FIELD

Embodiments described herein relate to an information processing device, an information processing method and a computer program product.

BACKGROUND

Recently, there is a demand for a technique to exclude vulnerability inside a system as much as possible along with an increase of attack cases toward critical infrastructures. A test technique, a so-called fuzz testing (fuzzing), has been used as one of techniques to confirm presence or absence of the vulnerability. The fuzz testing is a technique to perform a test using test data obtained by rewriting each factor (parameter) of normal data based on the normal data which is configured to normally operate a device under test. In addition, it has been known that there is case where correction is performed so as to obtain correct data as the test data (final packet) in addition the rewriting of the factor in order to perform the fuzz testing. For example, when data of CRC32 is included in the test data to be used for the test, it is necessary to perform calculation of CRC32 with respect to the rewritten data and reflect the calculation result.

However, there is a case where it is difficult to suitably perform the test depending on a combination between a rewriting process and a correction process which are configured to perform the fuzz testing. For example, when data of CRC32 is rewritten through the rewriting process and then the rewritten data of CRC32 is corrected through the correction process in the test using the test data including the CRC32, an effect of the rewriting process disappear, and there is a problem that it is difficult to suitably perform the test.

BRIEF DESCRIPTION OF THE DRAWINGS

FIG. 22 is a diagram illustrating a function of a test data generation device according to the fourth embodiment;

FIG. 23 is a diagram illustrating an operation dependency relationship according to the fourth embodiment;

FIG. 24 is a diagram illustrating normal data according to the fourth embodiment;

DETAILED DESCRIPTION

According to an embodiment, an information processing device includes a processor. The processor is configured to: execute a rewriting process to rewrite some of a plurality of factors, included in data for normal operation of a target device, into a value different from a normal value; execute a correction process that is performed in a course of generating test data to be used for a test of the target device; and determine a method of generating the test data based on a rewriting part that indicates a factor serving as a target of the rewriting process and based on a correction part that indicates a factor serving as a target of the correction process.

Hereinafter, an information processing device according to an embodiment, and embodiments of an information processing method and a program will be described in detail with reference to the appended drawings.

First Embodiment

Figure 1:
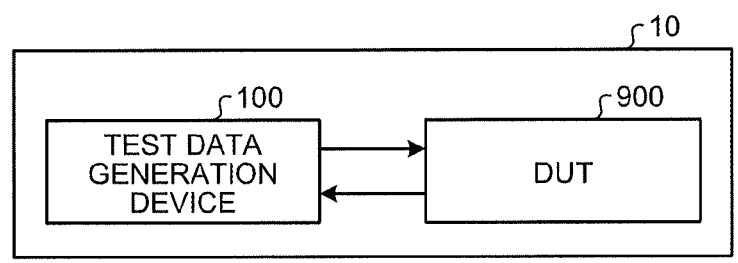
FIG. 1 is a diagram illustrating a configuration of an information processing system according to a first embodiment.

FIG. 1 is a diagram illustrating an example of a schematic configuration of an information processing system 10 according to the present embodiment. As illustrated in FIG.

1, the information processing system 10 includes a test data generation device 100 and a device under test (DUT) 900. The test data generation device 100 is an example of an "information processing device", generates test data configured to test the DUT 900, and sends the generated test data to the DUT 900. The DUT 900 is an example of a "target device" and assumes a device which is released as a product. When receiving the test data from the test data generation device 100, the DUT 900 operates based on the received test data and replies operation result information indicating a result of the operation to the test data generation device 100. The test data generation device 100 can estimate a cause that brings out a trouble by analyzing the operation result information received from the DUT 900.

Figure 2:
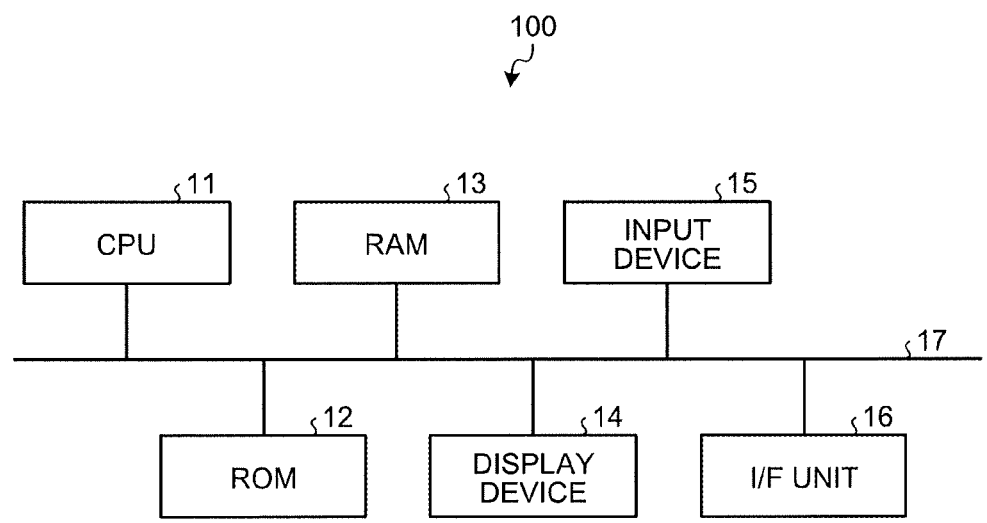
FIG. 2 is a diagram illustrating a hardware configuration of a test data generation device according to the first embodiment.

FIG. 2 is a diagram illustrating an example of a hardware configuration of the test data generation device 100. As illustrated in FIG. 2, the test data generation device 100 includes a CPU 11, a ROM 12, a RAM 13, a display device 14, an input device 15, and an I/F unit 16, and these units are connected to each other via a bus 17.

The CPU 11 comprehensively controls the operation of the test data generation device 100. The ROM 12 is a non-volatile memory which stores a program or various kinds of data. The RAM 13 is a volatile memory which functions as a working space (work area) of various operation processes to be executed by the CPU 11. The display device 14 is a display device which displays various kinds of information and is configured using, for example, a liquid crystal display device. The input device 15 is a device which is used for various operations and is configured using, for example, a mouse, a keyboard, and the like. The I/F unit 16 is interface which is configured for connection with an external device such as the DUT 900. For example, the test data generation device 100 may be provided in a mode of being connected to the PUT 900 via a network such as the Internet.

Figure 3:
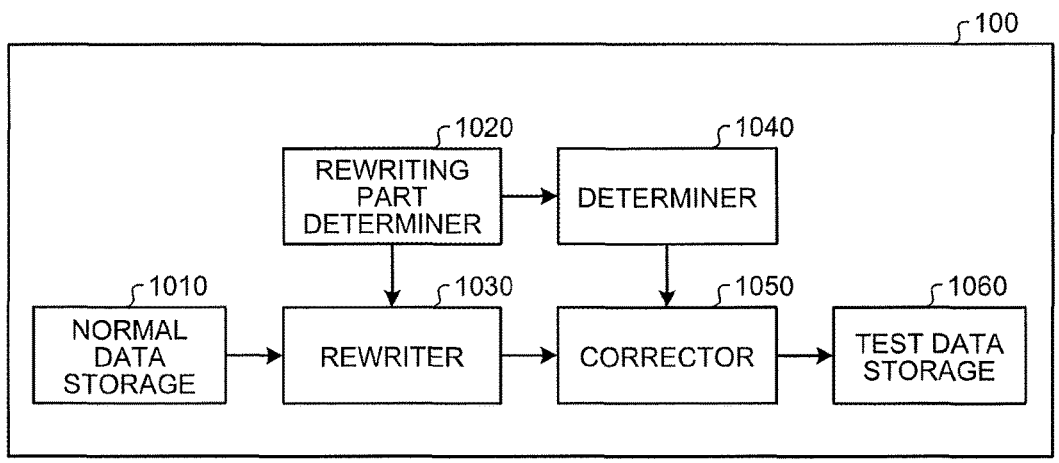
FIG. 3 is a diagram illustrating a function of the test data generation device according to the first embodiment.

FIG. 3 is a diagram illustrating an example of a function of the test data generation device 100. As illustrated in FIG. 3, the test data generation device 100 includes a normal data storage 1010, a rewriting part determiner 1020, a rewriter 1030, a determiner 1040, a corrector 1050, and a test data storage 1060.

The normal data storage 1010 stores normal data (an example of "data") which is configured for the normal operation of the DUT 900. The test data generation device 100 generates test data based on this normal data.

The rewriting part determiner 1020 determines a rewriting part which is a part to be rewritten among the normal data. For example, the rewriting part determiner 1020 may randomly select a factor serving as a rewriting target from a plurality of the factors (parameters) included in the normal data. One or more factors (factors serving as the rewriting targets) selected in this manner serve as the rewriting parts.

The rewriter 1030 executes a rewriting process to rewrite some of the plurality of factors included in the normal data into a value which is different from a normal value. In this example, the rewriter 1030 executes the rewriting process on the rewriting part, determined by the rewriting part determiner 1020, among the normal data. Hereinafter, the normal data to which the rewriting process has been performed by the rewriter 1030 is referred to as "rewritten data" in some cases.

The determiner 1040 determines a method of generating the test data based on the rewriting part (the rewriting part determined by the rewriting part determiner 1020), which indicates the factor serving as the target of the rewriting process, and a correction part serving as a target of a correction process to be described later. Here, a factor serving as the target of the correction process to be described later among the plurality of factors included in the normal data is set in advance. In the present embodiment, the determiner 1040 determines not to execute the correction process to be described later with respect to a factor serving as both the rewriting part and the correction part. Further, the determiner 1040 sends determination information indicating a result of the determination to the corrector 1050.

The corrector 1050 executes the correction process which is performed in the course of generating the test data (the test data configured to be supplied to the DUT 900 to operate the DUT 900) to be used for the test of the DUT 900. In this example, the corrector 1050 executes the correction process with respect to the above-described rewritten data based on the determination information from the determiner 1040. The corrector 1050 does not execute the correction process with respect to a factor, which indicates no execution of the correction process based on the determination information even if the factor is the correction part set in advance, among the plurality of factors included in the rewritten data. That is, the corrector 1050 executes the correction process only for a factor, which is not the factor indicating no execution of the correction process based on the determination information, but is the factor serving as the correction part set in advance, among the plurality of factors included in the rewritten data.

The correction process is typically correction which relates to communication with the DUT 900. For example, a process of correcting communication information (including an identifier such as a sequence number and an IP address), which is used for communication with the DUT 900 is exemplified as the correction process, but correction process is not limited thereto and may be an invertible transformation process including, for example, encryption, compression, and the like.

The rewritten data after being subjected to the above-described correction process becomes the test data and is stored in the test data storage 1060. The test data generation device 100 sends the test data stored in the test data storage 1060 to the DUT 900, thereby executing the test.

The above-described functions (the rewriting part determiner 1020, the rewriter 1030, the determiner 1040, and the corrector 1050), included in the test data generation device 100, are implemented when the CPU 11 executes the program stored in the ROM 12 and the like, but the embodiment is not limited thereto and may have a mode in which at least a part of the above-described functions is implemented by a dedicated hardware circuit (such as a semiconductor integrated circuit), for example. In addition, the above-described normal data storage 1010 and the test data storage 1060 may be implemented by, for example, the ROM 12 or by, for example, an auxiliary storage device such as an HDD.

Figure 4:
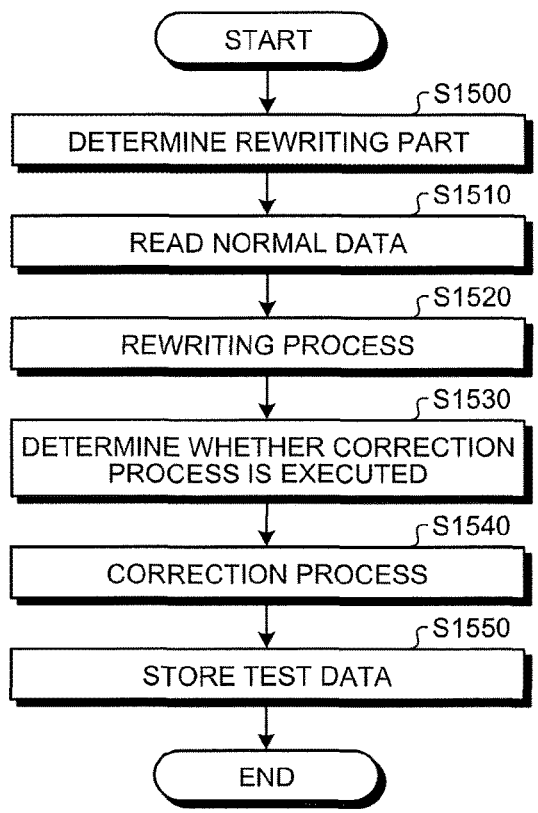
FIG. 4 is a diagram illustrating an operational example of the test data generation device according to the first embodiment.

FIG. 4 is a flowchart illustrating an operational example of the test data generation device 100 in the case of generating the test data. As illustrated in FIG. 4, the rewriting part determiner 1020 determines the rewriting part which is the part to be rewritten among the normal data (Step S1500). Further, the rewriter 1030 and the determiner 1040 are notified of the determined rewriting part.

Next, the rewriter 1030 reads the normal data from the normal data storage 1010 (Step S1510), and executes the rewriting process to rewrite the normal data based on the rewriting part notified by the rewriting part determiner 1020 (Step S1520). The rewritten data obtained in this manner is sent to the corrector 1050.

Next, the determiner 1040 determines whether the correction process is executed or not executed for each factor based on the rewriting part notified by the rewriting part determiner 1020 and the above-described correction part set in advance (Step S1530). As described above, it is determined that the correction process is not executed for the factor serving as both the rewriting part and the correction part. Further, the determiner 1040 sends determination information indicating the result of the determination to the corrector 1050.

The corrector 1050 executes the correction process with respect to the rewritten data sent from the rewriter 1030 based on the determination information received from the determiner 1040 (Step S1540). As described above, the corrector 1050 executes the correction process only for the factor, which is not the factor indicating no execution of the correction process based on the determination information received from the determiner 1040, but is the factor serving as the correction part set in advance, among the plurality of factors included in the rewritten data.

Further, the corrector 1050 causes the test data obtained as a result of Step S1540 to be stored in the test data storage 1060 (Step S1550).

Figure 5:
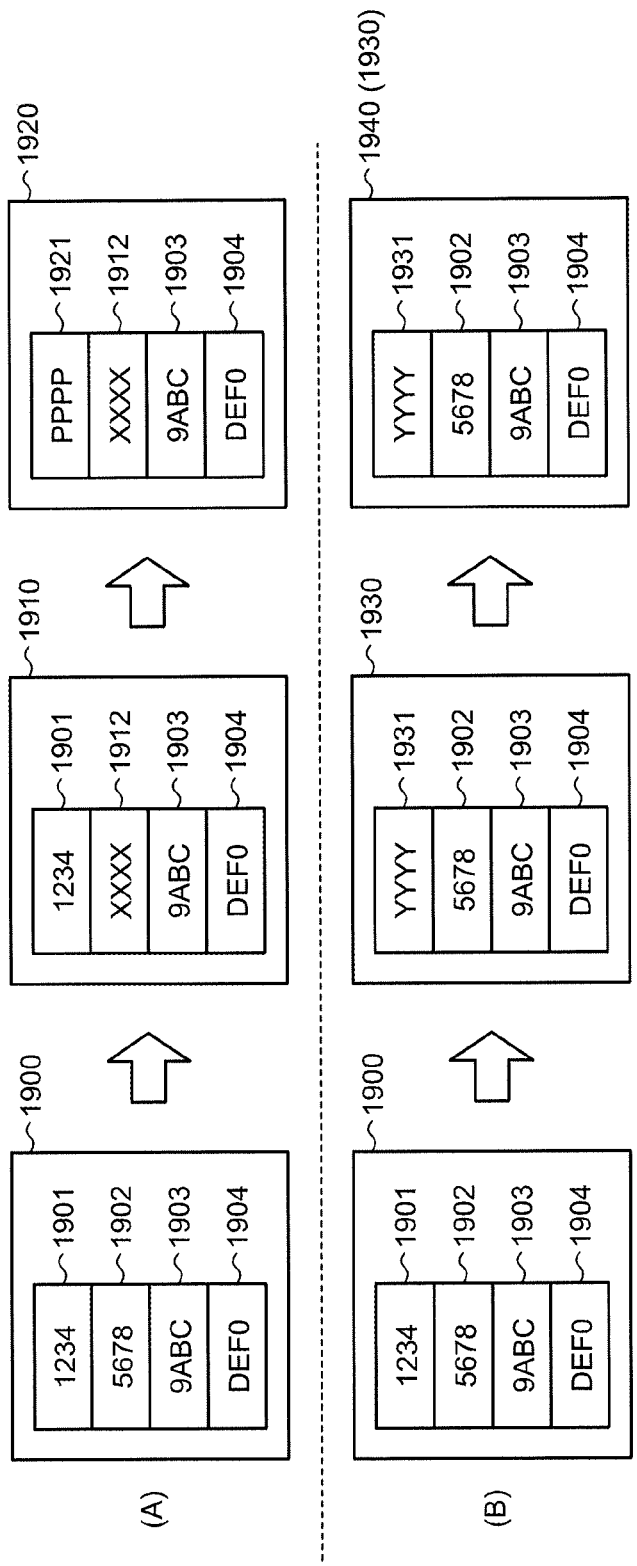
FIG. 5 illustrates specific examples of data which are used in the first embodiment.

FIG. 5 illustrates examples of normal data 1900, rewritten data (1910 and 1930), and test data (1920 and 1940). In the examples of FIG. 5, each data includes four factors (parameters), and the four factors included in the normal data 1900, the four factors included in the rewritten data (1910 or 1930), and the four factors included in the test data (1920 or 1940) correspond to each other. For example, a first-line factor 1901 included in the normal data 1900 corresponds to the first-line factor 1901 included in the rewritten data 1910 and a first-line factor 1921 included in the test data 1920 (respective values are different from each other but have the common parameter) in (A) in FIG. 5. Other factors are set in the same manner.

Here, it is assumed a case where a first factor, which is the first-line factor, is the correction part in any of (A) and (B) in FIG. 5. In FIG. 5, (A) assumes a case where the rewriting part determiner 1020 determines a second factor, which is the second-line factor, as the rewriting part, and (B) assumes a case where the rewriting part determiner 1020 determines the first factor as the rewriting part.

In (A) in FIG. 5, there is no factor serving as both the rewriting part and the correction part among the four factors, and thus, the rewriter 1030 rewrites a factor 1902, which is the second factor among the four factors included in the normal data 1900, into a factor 1912 (rewrites the parameter value), thereby generating the rewritten data 1910. Further, the corrector 1050 corrects the factor 1901, which is the first factor among the four factors included in the rewritten data 1910, into the factor 1921 (corrects the parameter value), thereby generating the test data 1920.

In addition, the first factor serves as both the rewriting part and the correction part among the four factors in (B) in FIG. 5, and thus, the rewriter 1030 first rewrites the factor 1901, which is the first factor among the four factors included in the normal data 1900, into a factor 1931 (rewrites the parameter value), thereby generating the rewritten data 1930. Further, the corrector 1050 sets the rewritten data 1930 directly as the test data 1940 without executing the correction process with respect to the factor 1931 which is the first factor among the four factors included in the rewritten data 1930.

As described above, the test data generation device 100 according to the present embodiment determines the method of generating the test data based on the rewriting part which indicates the factor serving as the target of the rewriting process and the correction part which indicates the factor serving as the target of the correction process. For more detail, the correction process is not executed for the factor serving as both the rewriting part and the correction part. Accordingly, it is possible to avoid disappearance of an effect of the rewriting process due to the correction process, and thus, there is an advantage that it is possible to suitably test the DUT 900.

Modified Example of First Embodiment

In the above-described first embodiment, it is determined whether the factor serving as both the rewriting part and the correction part is present among the factors included in the rewritten data after executing the rewriting process of the normal data, but this order may be reversed. That is, a mode may be configured such that the rewriting part is determined to determine whether the factor serving as both the rewriting part and the correction part is present among the factors included in the normal data, and then, the rewriting process and the correction process are executed.

Second Embodiment

In the present embodiment, a description will be given by exemplifying a case where invertible transformation such as encryption is performed as the above-described correction process. Incidentally, common parts as those of the above-described first embodiment will be denoted by the same reference numerals and the description thereof will be suitably omitted.

Figure 6:
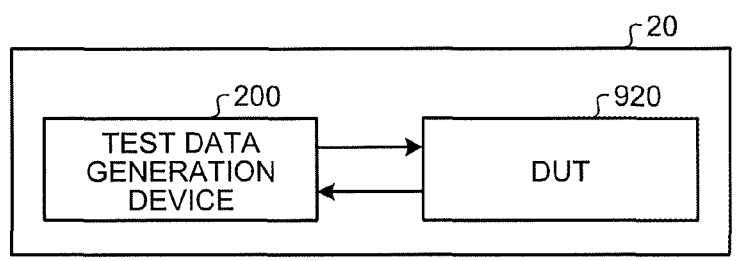
FIG. 6 is a diagram illustrating a configuration of an information processing system according to a second embodiment.

FIG. 6 is a diagram illustrating an example of a schematic configuration of an information processing system 20 according to the present embodiment. As illustrated in FIG. 6, the information processing system 20 includes a test data generation device 200 and a DUT 920. The test data generation device 200 is an example of the "information processing device", generates test data configured to test the DUT 920, and sends the generated test data to the DUT 920. The DUT 920 is an example of the "target device" and assumes a device which is released as a product. When receiving the test data from the test data generation device 200, the DUT 920 operates based on the received test data and replies operation result information indicating a result of the operation to the test data generation device 200. The test data generation device 200 can estimate a cause that brings out a trouble by analyzing the operation result information received from the DUT 920.

Figure 7:
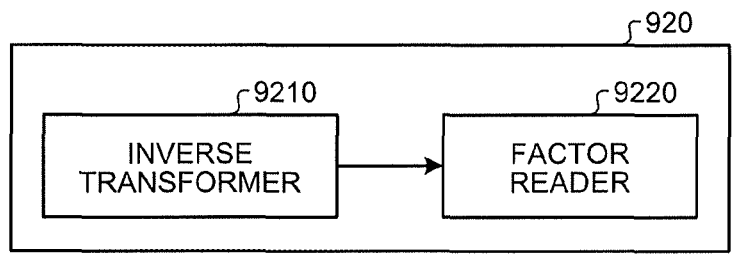
FIG. 7 is a diagram illustrating a function of a device under test (DUT) according to the second embodiment.

FIG. 7 is a diagram illustrating an example of a function of the DUT 920. Here, for convenience of the description, a hardware configuration of the DUT 920 is the same as that of FIG. 2, and the function of the DUT 920 may be implemented when the CPU 11 executes a program stored in the ROM 12 or the like or may be implemented by a dedicated hardware circuit (such as a semiconductor integrated circuit).

As illustrated in FIG. 7, the DUT 920 includes an inverse transformer 9210 and a factor reader 9220. The inverse transformer 9210 performs an inverse transformation process with respect to the test data sent from the test data generation device 200 and sends the inverse-transformed data, which indicates the data obtained through the inverse transformation process, to the factor reader 9220. The factor reader 9220 reads each value of factors included in the inverse-transformed data received from the inverse transformer 9210.

Figure 8:
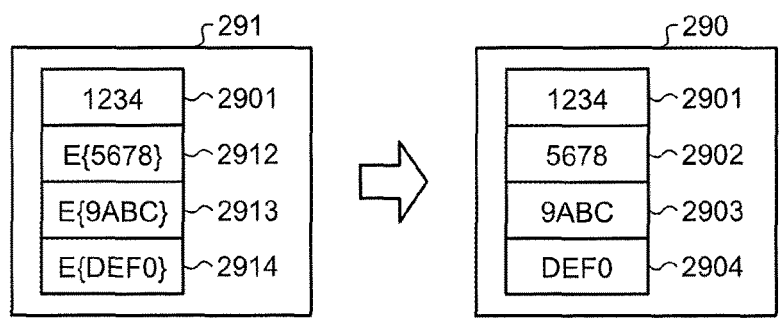
FIG. 8 is a diagram illustrating data which is processed by the DUT according to the second embodiment.

FIG. 8 is a diagram illustrating each example of the test data sent from the test data generation device 200, that is, input data 291 input to the inverse transformer 9210 and the inverse-transformed data 290 obtained by the inverse transformation performed by the inverse transformer 9210. In the example of FIG. 8, the input data 291 includes a factor 2901, a factor 2912, a factor 2913, and a factor 2914. Each value of the factor 2912, the factor 2913, and the factor 2914 is a value obtained by performing any transformation (for example, encryption and the like) which corresponds to the inverse transformation.

On the other hand, the inverse-transformed data 290 includes the factor 2901, a factor 2902, a factor 2903, and a factor 2904. Each value of the factor 2902, the factor 2903, and the factor 2904 is a value obtained by inverse operation performed by the inverse transformer 9210, and, for example, the value of the factor 2902 is the value obtained by performing the inverse transformation of the value of the factor 2912. Here, it is necessary to supply data for a test to the factor 2912 and the like in order to test the inverse transformer 9210 while it is necessary to supply data for a test to the factor 2902 and the like in order to test the factor reader 9220 from a viewpoint of testing the DUT 920. That is, it is necessary to perform a test in accordance with each unit of the DUT 920 in order to test each unit. In particular, when the DUT 920 includes an invertible transformation process, it is necessary to supply the test data configured to test each unit since the respective factors (parameters) configured to test the inverse transformation process and the factor reading process are the same item (with different values).

Figure 9:
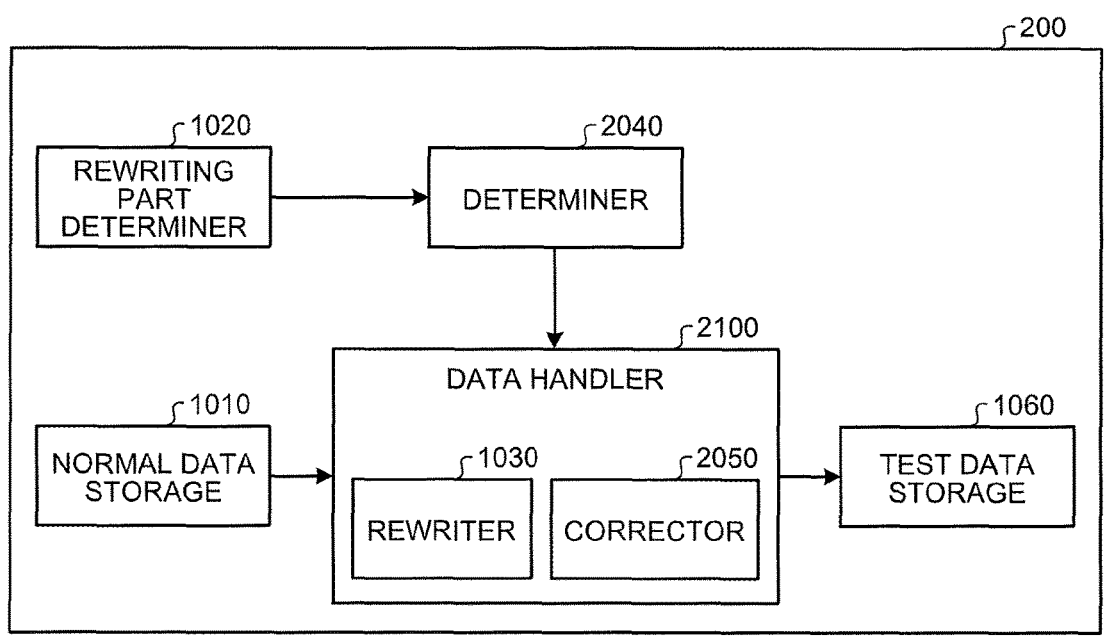
FIG. 9 is a diagram illustrating a function of a test data generation device according to the second embodiment.

FIG. 9 is a diagram illustrating an example of a function of the test data generation device 200. As illustrated in FIG. 9, the test data generation device 200 includes the normal data storage 1010, the rewriting part determiner 1020, a determiner 2040, a data handler 2100, and the test data storage 1060. In addition, the data handler 2100 includes the rewriter 1030 and a corrector 2050.

The respective functions of the normal data storage 1010 and the rewriting part determiner 1020 are the same as those of the above-described first embodiment, and the detailed description thereof will be omitted. The determiner 2040 determines generation of two kinds of test data when the factor serving as both the above-described rewriting part and the above-described correction part is present. For more detail, the determiner 2040 determines generation of first test data, which is obtained by executing the correction process after executing the rewriting process with respect to the normal data, and second test data which is obtained by executing the rewriting process after executing the correction process with respect to the normal data. The correction process according to the present embodiment is the process of performing the invertible transformation. The invertible transformation is the encryption in this example, but may be compression, for example, without being limited thereto. The determiner 2040 sends determination information, which indicates a result of the above-described determination, to the data handler 2100.

The data handler 2100 generates the test data from the normal data based on the determination information received from the determiner 2040. The data handler 2100 generates the test data using the rewriter 1030 and the corrector 2050. The function of the rewriter 1030 is the same as the content that has been described in the above-described first embodiment. In addition, here, the correction process executed by the corrector 2050 is the process of performing the invertible transformation with respect to the correction part (factor as a correction target).

Figure 10:
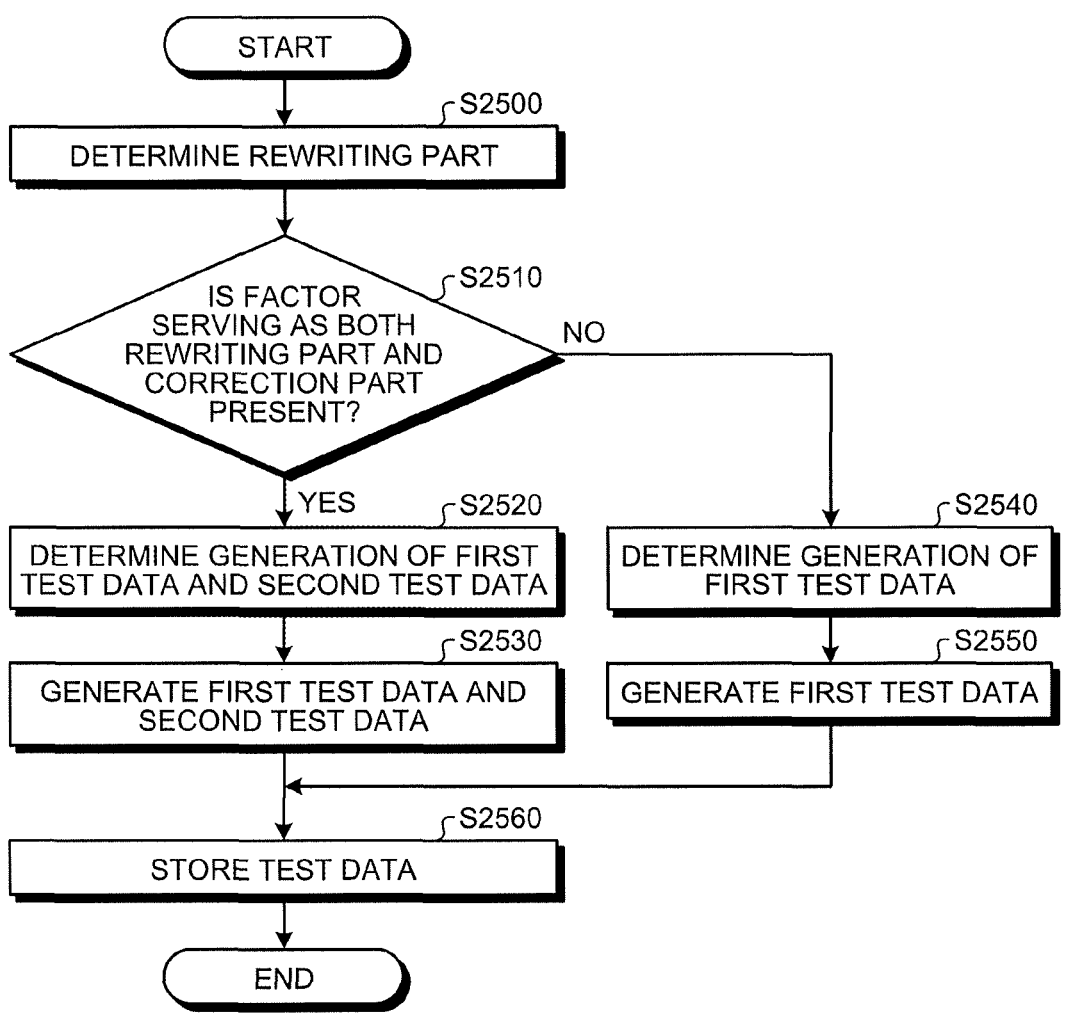
FIG. 10 is a diagram illustrating an operational example of the test data generation device according to the second embodiment.

FIG. 10 is a flowchart illustrating an operational example of the test data generation device 200 in the case of generating the test data. As illustrated in FIG. 10, the rewriting part determiner 1020 determines the rewriting part which is the part to be rewritten among the normal data (Step S2500). Further, the rewriting part determiner 1020 notifies the determiner 2040 of the determined rewriting part.

The determiner 2040 determines whether a factor, which serves as both the rewriting part notified by the rewriting part determiner 1020 and the correction part set in advance, is present (Step S2510). In this example, the determiner 2040 determines whether the factor serving as both the above-described rewriting part and the above-described correction part is present among the plurality of factors included in the normal data.

When a result of the determination in Step S2510 is positive (Step S2510: Yes), the determiner 2040 determines generation of the above-described first test data and the above-described second test data (Step S2520) and sends determination information indicating a result of the determination to the data handler 2100. The data handler 2100, which has received the determination information, generates the first test data and the second test data based on the determination information (Step S2530).

A procedure of the case of generating the first test data is as follows. The data handler 2100 reads the normal data from the normal data storage 1010, and causes the rewriter 1030 to execute the rewriting process to rewrite the above-described rewriting part among the read normal data, thereby obtaining rewritten data. Incidentally, a method of grasping the rewriting part used by the data handler 2100 is arbitrary. For example, information indicating the rewriting part may be included in the determination information which is notified by the determiner 2040, or a mode of, for example, receiving notification of the rewriting part from the rewriting part determiner 1020 may be configured. Further, the data handler 2100 causes the corrector 2050 to execute the correction process to correct the correction part set in advance among the rewritten data, thereby obtaining the first test data.

In addition, a procedure of the case of generating the second test data is as follows. The data handler 2100 reads the normal data from the normal data storage 1010, and causes the corrector 2050 to execute the correction process to correct the correction part set in advance among the read normal data, thereby obtaining corrected data. Further, the data handler 2100 causes the rewriter 1030 to execute the rewriting process to rewrite the above-described rewriting part among the corrected data, thereby obtaining the second test data.

Meanwhile, when the above-described result in Step S2510 is negative (Step S2510: No), the determiner 2040 determines generation of only the above-described first test data (Step S2540) and sends determination information indicating a result of the determination to the data handler 2100. The data handler 2100, which has received the determination information, generates the first test data based on the determination information (Step S2550). The procedure of generating the first test data is as described above.

Further, the data handler 2100 causes the test data obtained in the above-described Step S2530 or the above-described Step S2550 to be stored in the test data storage 1060 (Step S2560).

Figure 11:
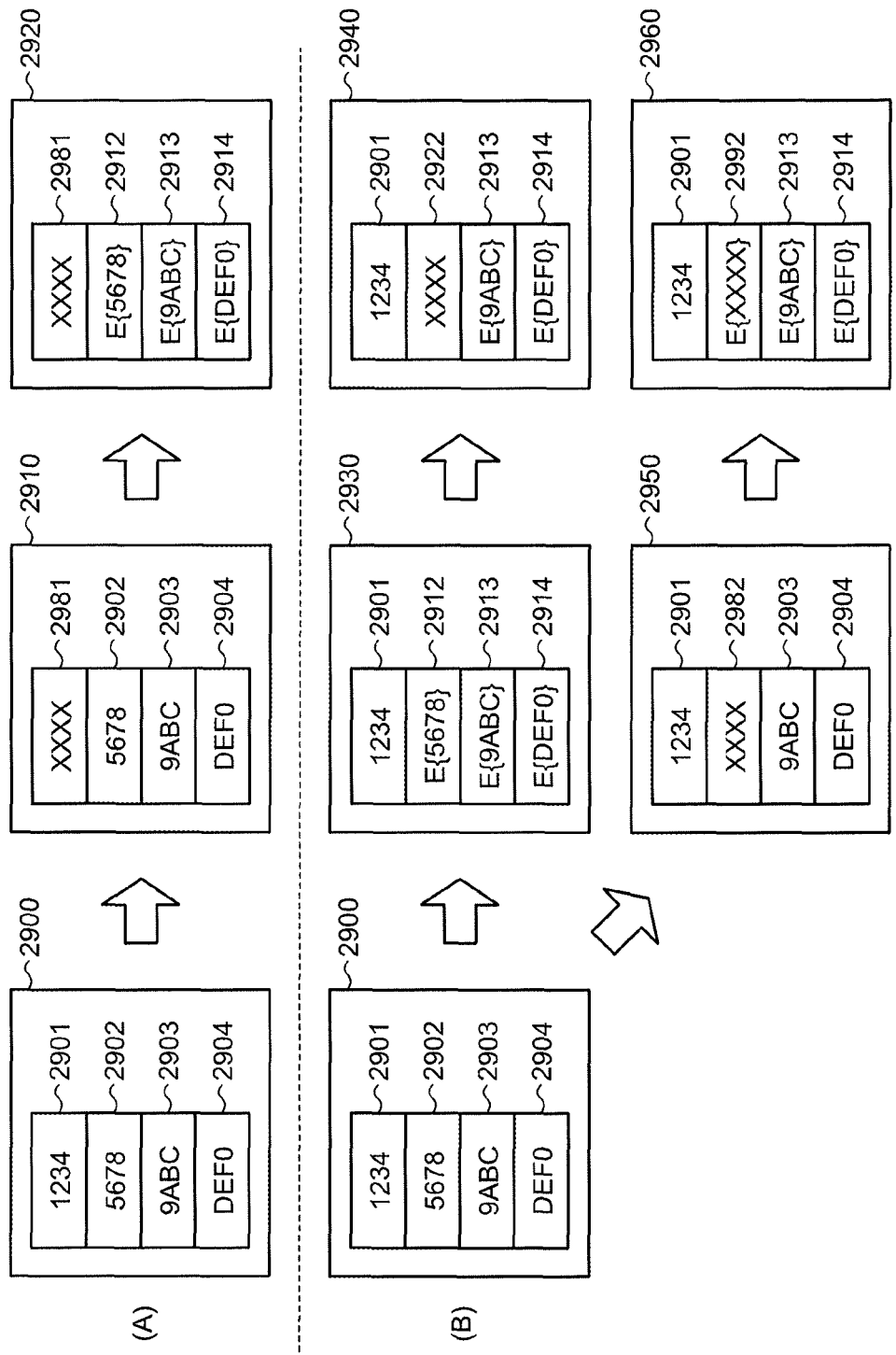
FIG. 11 illustrates specific examples of data which are used in the second embodiment.

FIG. 11 illustrates examples of normal data (2900), rewritten data (2910 and 2950), corrected data (2930), and test data (2920, 2940 and 2960). In the examples, each data includes four factors (parameters), and the four factors included in the normal data 2900, the four factors included in the rewritten data (2910 or 2950), the four factors included in the corrected data 2930, and the four factors included in the test data (2920, 2940 or 2960) correspond to each other.

Here, it is assumed a case where a second factor which is the second-line factor, a third factor which is the third-line factor, and a fourth factor which is the fourth-line factor are the correction parts in any of (A) and (B) in FIG. 11. In FIG. 11, (A) assumes a case where the rewriting part determiner 1020 determines a first factor, which is a first-line factor, as the rewriting part, and (B) assumes a case where the rewriting part determiner 1020 determines the second factor as the rewriting part.

In (A) in FIG. 11, there is no factor serving as both the rewriting part and the correction part among the four factors, and thus, the data handler 2100 rewrites a factor 2901, which is the first factor among the four factors included in the normal data 2900, into a factor 2981 (rewrites the parameter value) using the rewriter 1030, thereby generating the rewritten data 2910. Further, the data handler 2100 corrects the factor 2902, which is the second factor among the four factors included in the rewritten data 2910, into the factor 2912, corrects the factor 2903 (encrypts the parameter value), which is the third factor, into the factor 2913, and corrects the factor 2904, which is the fourth factor, into the factor 2914 using the corrector 2050, thereby generating the test data 2920.

In addition, the second factor among the four factors serves as both the rewriting part and the correction part in (B) in FIG. 11, and thus, the data handler 2100 corrects the factor 2902, which is the second factor among the four factors included in the normal data 2900, into the factor 2912 (encrypts the parameter value), corrects the factor 2903, which is the third factor, into the factor 2913, and corrects the factor 2904, which is the fourth factor, into the factor 2914 using the corrector 2050, thereby generating the corrected data 2930. In addition, the data handler 2100 rewrites the factor 2902, which is the second factor among the four factors included in the normal data 2900, into a factor 2982 using the rewriter 1030, thereby generating the rewritten data 2950.

Further, the data handler 2100 rewrites the factor 2912, which is the second factor among the four factors included in the described corrected data 2930, into a factor 2922 using the rewriter 1030, thereby generating the second test data 2940. In addition, the data handler 2100 corrects the factor 2982, which is the second factor among the four factors included in the above-described rewritten data 2950, into a factor 2992, corrects the factor 2903, which is the third factor, into the factor 2913, and corrects the factor 2904, which is the fourth factor, into the factor 2914 using the corrector 2050, thereby generating the first test data 2960.

As above, when the factor serving as both the rewriting part and the correction part is present among the factors included in the normal data, the test data generation device 200 according to the present embodiment generates the first test data, obtained by executing the correction process (encryption, in this example) after executing the rewriting process with respect to the normal data, and the second test data obtained by executing the rewriting process after executing the correction process with respect to the normal data. Accordingly, it is possible to generate the test data in accordance with each unit of the DUT 920, and thus, it is possible to suitably test each unit of the DUT 920.

Modified Example of Second Embodiment

In the above-described second embodiment, the correction process is the process of performing the invertible transformation and the invertible transformation is the encryption, but the correction process may be any process as long as the process of the invertible transformation without being limited thereto. For example, the invertible transformation (correction process) may be compression, and the inverse transformation performed by the inverse transformer 9210 is decompression.

In addition, it is determined whether the factor serving as both the rewriting part and the correction part is present before executing the rewriting process and the correction process using the data handler 2100 in the above-described second embodiment, but this order may be reversed. That is, it may be determined whether the factor serving as both the rewriting part and the correction part is present after generating the test data in the same manner as the above-described first embodiment. When a result of this determination is positive, additional test data is generated.

Third Embodiment

In the present embodiment, template data, which includes corrected data obtained by executing a correction process (encryption in this example) with respect to some factors among a plurality of factors included in predetermined data (herein, data corresponding to the above-described normal data) and a factor before being corrected (may be a factor indicating a value in the course of calculation for correction or a factor indicating an original value before being corrected), is a rewriting target, which is different from the above-described second embodiment. Incidentally, common parts as those of the above-described second embodiment will be suitably omitted.

Figure 12:
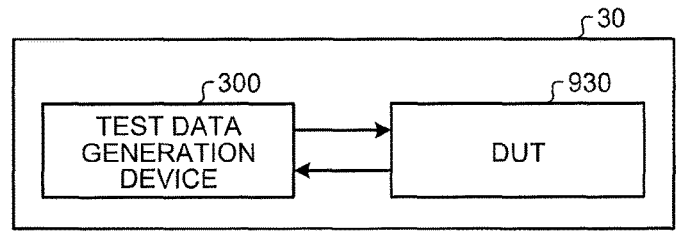
FIG. 12 is a diagram illustrating a configuration of an information processing system according to a third embodiment.

FIG. 12 is a diagram illustrating an example of a configuration of an information processing system 30 according to the present embodiment. As illustrated in FIG. 12, the information processing system 30 includes a test data generation device 300 and a DUT 930.

Figure 13:
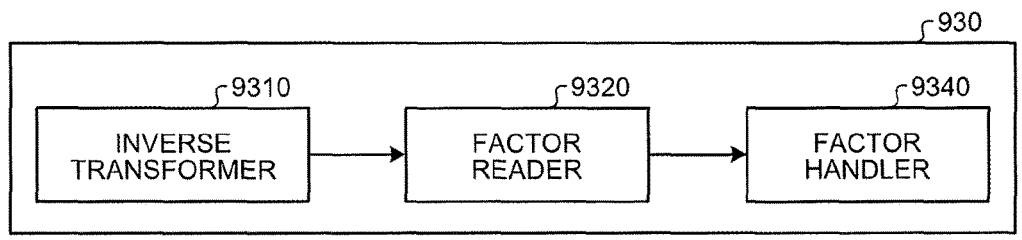
FIG. 13 is a diagram illustrating a function of a DUT according to the third embodiment.

FIG. 13 is a diagram illustrating an example of a function of the DUT 930. The DUT 930 includes an inverse transformer 9310, a factor reader 9320, and a factor handler 9340.

The inverse transformer 9310 performs inverse transform with respect to data, which has been sent from the test data generation device 300, and sends the inverse-transformed data to the factor reader 9320. The factor reader 9320 reads each value of factors from the inverse-transformed data, which has been received from the inverse transformer 9310, and sends the read value to the factor handler 9340. The factor handler 9340 performs device-specific processing with respect to the factor received from the factor reader 9320.

Figure 14:
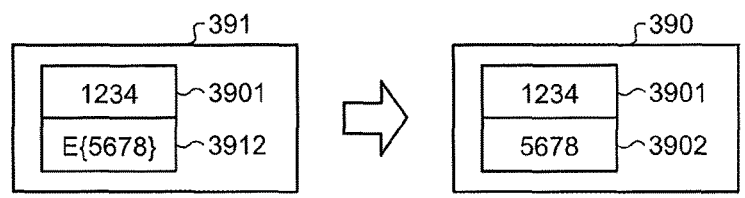
FIG. 14 is a diagram illustrating data which is processed by the DUT according to the third embodiment.

FIG. 14 illustrates each example of the data sent from the test data generation device 300, that is, input data 391 input to the inverse transformer 9310 and inverse-transformed data 390 which is the data inverse-transformed by the inverse transformer 9310. In the example of FIG. 14, the input data 391 includes a factor 3901 and a factor 3912. A value of the factor 3912 is a value obtained by performing any invertible transformation (for example, an encryption). On the other hand, the inverse-transformed data 390 includes the factor 3901 and a factor 3902. A value of the factor 3902 indicates a value obtained by performing the inverse operation of the factor 3912 using the inverse transformer 9310.

Here, it is necessary to supply data for a test to the factor 3912 in order to test the inverse transformer 9310 from the viewpoint of testing the DUT 930. On the other hand, it is necessary to supply data for a test to the factor 3902 in order to test the factor handler 9340. It is necessary to cause the inverse transformer 9310 to generate the factor 3902 by setting the value of the factor 3912 to a value transformed from the factor 3902 in order to supply the data for the test to the factor 3902.

Figure 15:
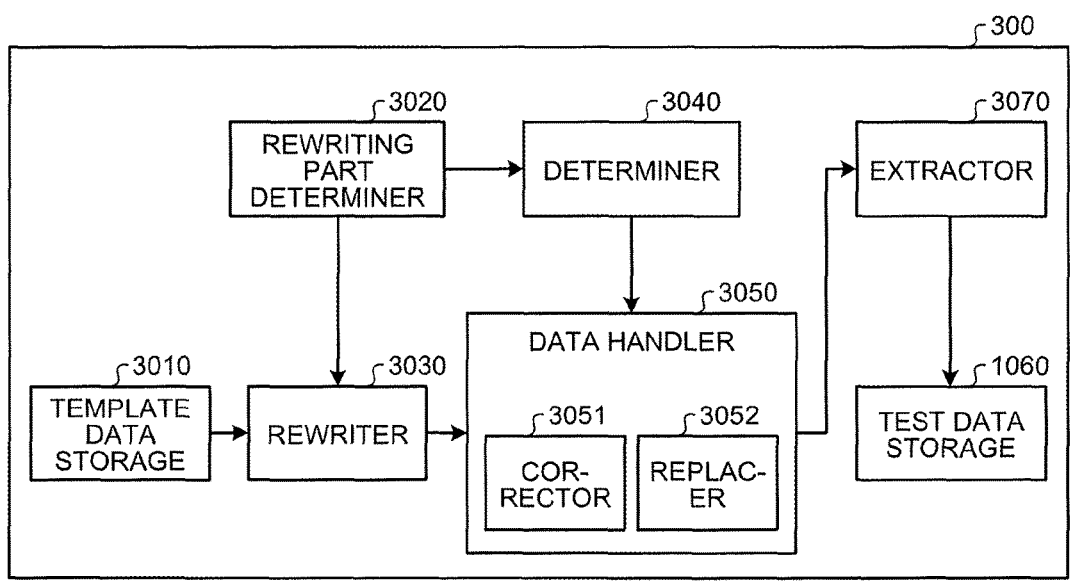
FIG. 15 is a diagram illustrating a function of a test data generation device according to the third embodiment.

FIG. 15 is a diagram illustrating an example of a function of the test data generation device 300 according to the present embodiment. As illustrated in FIG. 15, the test data generation device 300 includes a template data storage 3010, a rewriting part determiner 3020, a rewriter 3030, a determiner 3040, a data handler 3050, an extractor 3070, and the test data storage 1060. In addition, the data handler 3050 includes a corrector 3051 and a replacer 3052.

The template data storage 3010 stores the template data including the corrected data and internal data. In this example, the corrected data is the data obtained by executing an encryption process (an example of the correction process) with respect to some factors among the plurality of factors included in the predetermined data corresponding to the normal data according to the above-described respective embodiments. In addition, the internal data is the data including a factor before being encrypted (factor before being corrected). Incidentally, the factor before being encrypted (an example of the factor before being corrected) may be a factor indicating an original value before being encrypted or a factor indicating a value in the course of calculation for encryption.

The rewriting part determiner 3020 determines a rewriting part which is a part to be rewritten among the template data. The rewriter 3030 rewrites the template data based on the rewriting part, thereby generating rewritten data. In this example, the rewriter 3030 executes the rewriting process on the rewriting part, determined by the rewriting part determiner 3020, among the template data. Here, the corrected data or the internal data included in the template data or both the data may become the rewriting part.

When the internal data (the factor before being corrected) included in the template data is the rewriting part, the determiner 3040 determines to generate test data based on replaced data which is obtained by replacing a factor corresponding to the internal data among the factors included in the corrected data with replacement data (replacement factor), obtained by executing the correction process after executing the rewriting process with respect to the internal data.

The data handler 3050 processes the rewritten data, input from the rewriter 3030, based on the determination of the determiner 3040. For example, when the determiner 3040 determines to generate the above-described replaced data, the data handler 3050 generates the replaced data by causing the corrector 3051 to correct the internal data (rewritten internal data in this example) included in the rewritten data to generate the replacement data, and then, causing the replacer 3052 to replace the factor corresponding to the internal data among the factors included in the rewritten data (may be considered as the factors included in the corrected data) with the replacement data, thereby generating the replaced data. Further, the replaced data thus generated is sent to the extractor 3070. In addition, for example, when the determiner 3040 determines not to generate the above-described replaced data, the data handler 3050 directly sends the rewritten data input from the rewriter 3030 to the extractor 3070 without executing any process.

The extractor 3070 extracts a part other than the internal data among the data sent from the data handler 3050, and causes the extracted part to be stored in the test data storage 1060.

Figure 16:
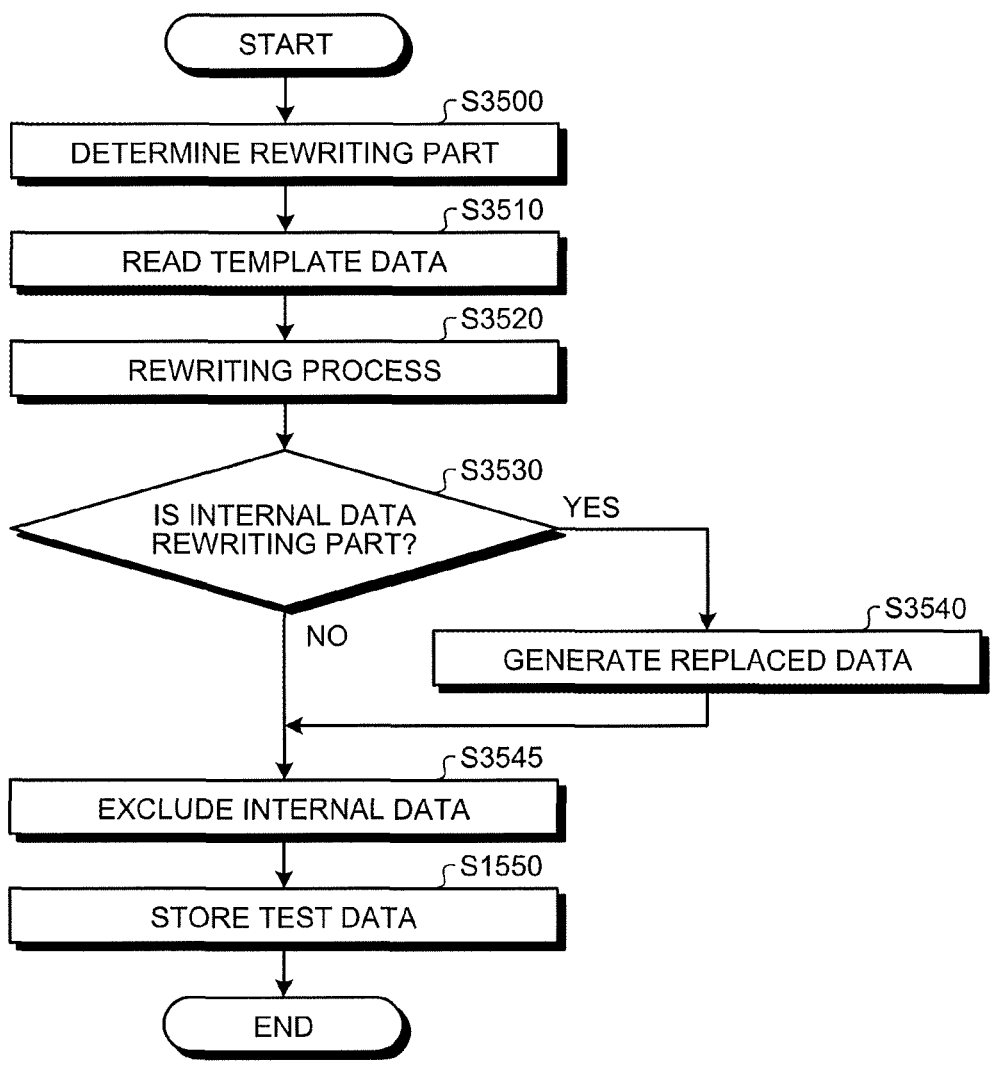
FIG. 16 is a diagram illustrating an operational example of the test data generation device according to the third embodiment.

FIG. 16 is a flowchart illustrating an operational example of the test data generation device 300 in the case of generating the test data. As illustrated in FIG. 16, the rewriting part determiner 3020 determines the rewriting part which is the part to be rewritten among the template data (Step S3500). Further, the rewriting part determiner 3020 notifies the rewriter 3030 and the determiner 3040 of the determined rewriting part.

Next, the rewriter 3030 reads the template data from the template data storage 3010 (Step S3510) and executes the rewriting process to rewrite the template data based on the rewriting part notified by the rewriting part determiner 3020 (Step S3520). The rewritten data obtained in this manner is sent to the data handler 3050.

Next, the determiner 3040 determines whether the internal data is the rewriting part based on the rewriting part notified by the rewriting part determiner 3020 and the correction part set in advance (Step S3530). When a result of Step S3530 is positive (Step S3530: Yes), the determiner 3040 determines to generate the above-described replaced data and notifies the data handler 3050 of determination information indicating a result of the determination. The data handler 3050, which has received the notification, generates the above-described replaced data from the rewritten data sent from the rewriter 3030 (Step S3540). Further, the replaced data thus generated is sent to the extractor 3070.

On the other hand, when the above-described result of Step S3530 is negative (Step S3530: No), the determiner 3040 determines not to generate the above-described replaced data and notifies the data handler 3050 of determination information indicating a result of the determination. The data handler 3050, which has received the notification, sends the rewritten data sent from the rewriter 3030 directly to the extractor 3070.

Next, the extractor 3070 excludes the internal data from the data sent from the data handler 3050 (Step S3545). Here, the extractor 3070 extracts the part other than the internal data among the data sent from the data handler 3050, and causes the extracted test data to be stored in the test data storage 1060 (Step S1550).

Figure 17:
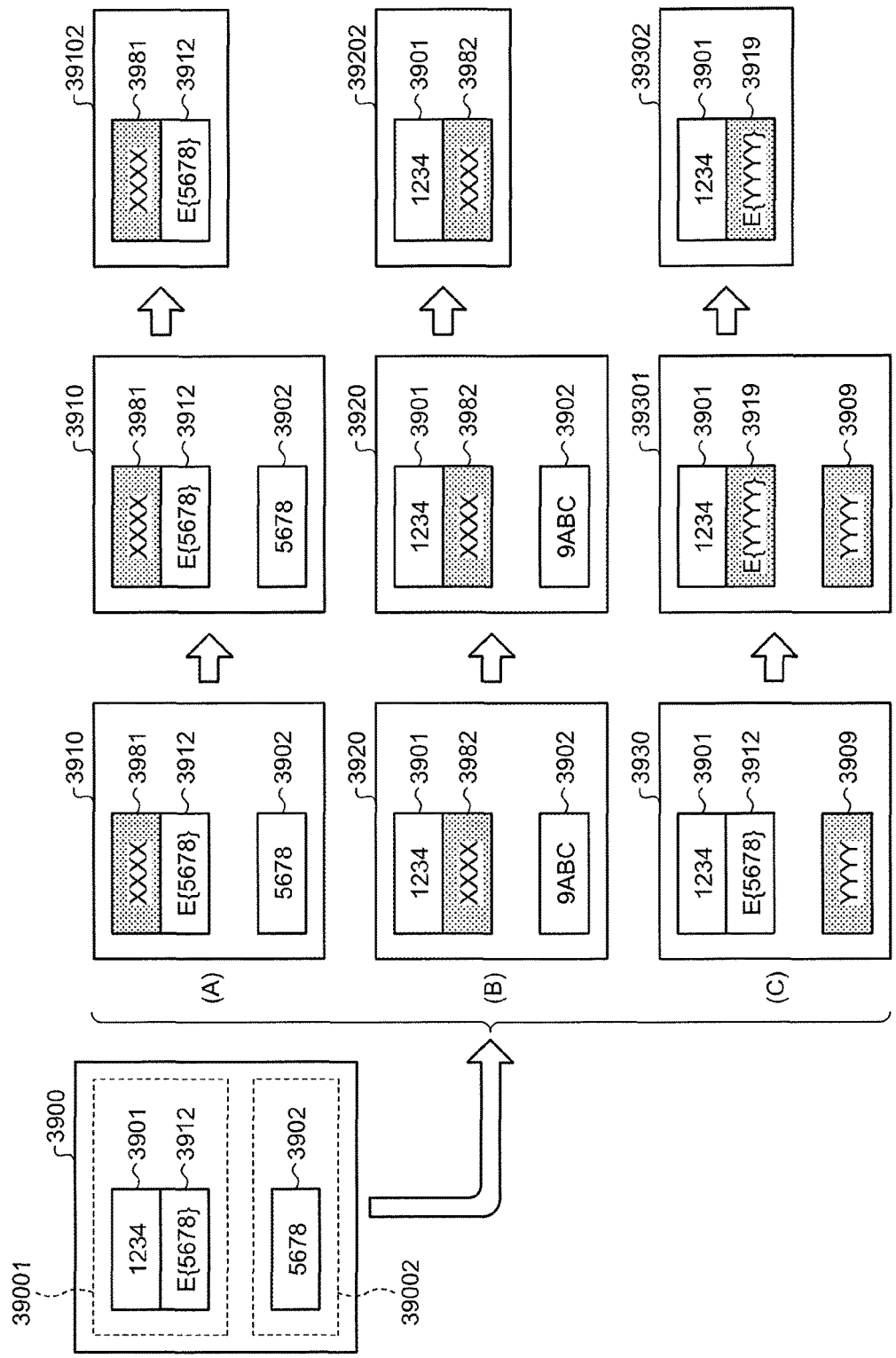
FIG. 17 illustrates specific examples of data which are used in the third embodiment.

FIG. 17 illustrates examples of the template data, the rewritten data, the replaced data, and the test data. In this example, template data 3900 includes corrected data 39001 and internal data 39002. The corrected data 39001 includes the factors 3901 and 3912, and the internal data 39002 includes the factor 3902. Here, the factor 3902 included in the internal data 39002 is the factor before being encrypted (factor before being corrected) of the factor 3912 which is a second factor of the corrected data 39001.

In (A) in FIG. 17, the rewriting part is a first factor of the corrected data 39001, and rewritten data 3910 is generated by rewriting the factor 3901, which is the first factor of the corrected data 39001, into a factor 3981. In (B) in FIG. 17, the rewriting part is the second factor of the corrected data 39001, and rewritten data 3920 is generated by rewriting the factor 3912, which is the second factor of the corrected data 39001, into a factor 3982. In (C) in FIG. 17, the rewriting part is a factor of the internal data 39002, and rewritten data 3930 is generated by rewriting the factor 3902 of the internal data 39002 into a factor 3909.

The rewriting part is not the internal data 39002 in the case of (A) in FIG. 17, and thus, the data handler 3050 directly sends the rewritten data 3910 sent from the rewriter 3030 to the extractor 3070, and the extractor 3070 generates test data 39102 by excluding the factor 3902 which corresponds to the internal data among the rewritten data 3910.

The rewriting part is not the internal data 39002 in the case of (B) in FIG. 17, and thus, the data handler 3050 directly sends the rewritten data 3920 sent from the rewriter 3030 to the extractor 3070, and the extractor 3070 generates test data 39202 by excluding the factor 3902 which corresponds to the internal data among the rewritten data 3920.

The rewriting part is the internal data 39002 in the case of (C) in FIG. 17, and thus, the data handler 3050 corrects (encrypts in this example) the rewritten internal data (the factor 3909) included in the rewritten data 3930 into a factor 3919, thereby forming the replacement data. Further, the data handler 3050 generates replaced data 39301 by replacing the factor 3912, which corresponds to the internal data 39002 between the factor 3901 and the factor 3912 included in the rewritten data 3930 (can be considered as factors included in the corrected data 39001), with the replacement data (the factor 3919). Further, the replaced data 39301, thus generated, is sent to the extractor 3070. The extractor 3070 generates test data 39302 by excluding the factor 3909 (rewritten internal data in this example) which corresponds to the internal data among the replaced data 39301.

Figure 18:
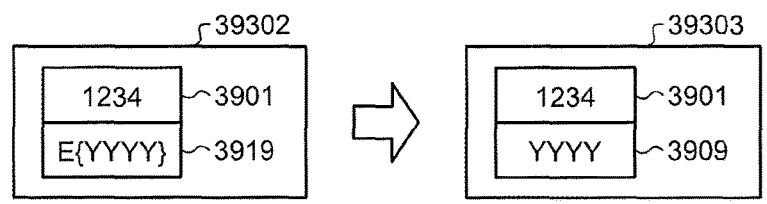
FIG. 18 is a diagram illustrating data which is processed by the DUT according to the third embodiment.

FIG. 18 illustrates each example of the test data sent from the test data generation device 300 to the DUT 930, that is, the data input to the inverse transformer 9310 and data inverse-transformed by the inverse transformer 9310. Here, the test data 39302 generated in (C) in FIG. 17 is assumed as the test data.

The inverse transformer 9310 receives the input of the test data 39302 and outputs the data 39303 obtained by inverse-transforming the factor 3919 into the factor 3909. The factor reader 9320 reads the factor 3901 and the factor 3909. The factor handler 9340 processes a value YYYY of the factor 3909. This value YYYY is a value rewritten by the rewriter 3030 of the test data generation device 300. In this manner, it is possible to perform a test that causes the factor handler 9340 to process the rewritten value YYYY. As illustrated in this example, it is possible to cause the DUT 930 to process the rewritten internal data even when the data processed by the DUT 930 is the internal data that is not directly shown as a part of the test data by causing results obtained by transforming the rewritten internal data using a plurality of methods to be included in the test data 39302.

As described above, the test data generation device 300 according to the present embodiment sets the above-described template data including the corrected data and the factor before being corrected (the internal data) as a rewriting target, and generates the test data, configured for the test in the case of rewriting the value of the internal data, based on the replaced data which is obtained by replacing the factor corresponding to the internal data among the factors included in the corrected data with the replacement data (replacement factor), obtained by executing the correction process after executing the rewriting process with respect to the internal data, when the internal data is the rewriting part. Accordingly, it is possible to perform the test by changing the factor of the test target even when the factor of the test target is not directly included in the corrected data, and the value calculated from the factor of the test target is included in the corrected data.

Modified Example of Third Embodiment

Figure 19:
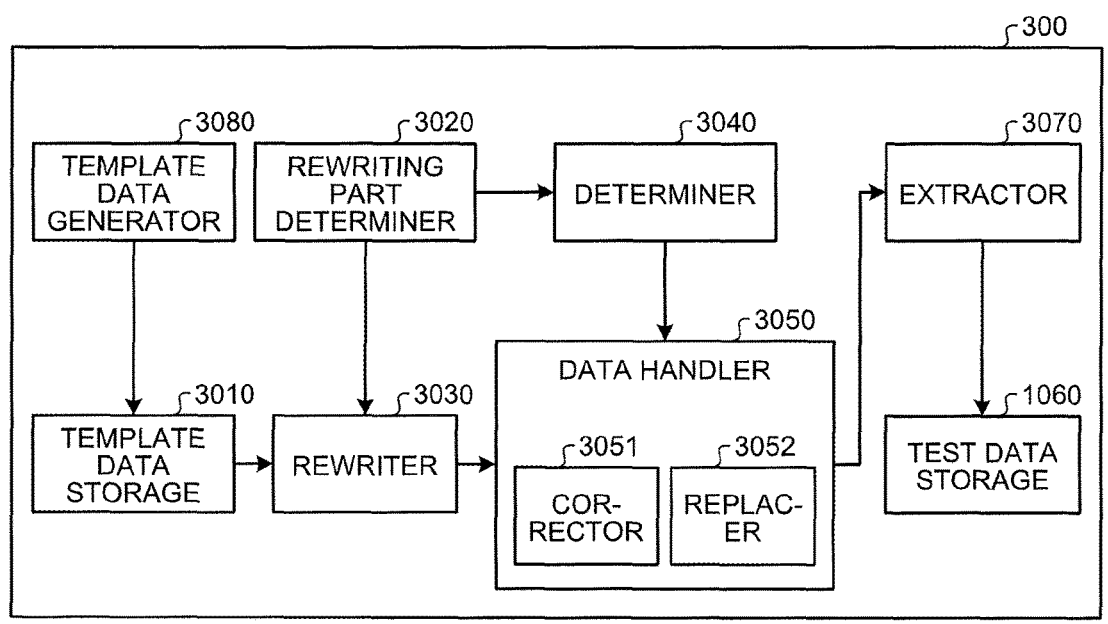
FIG. 19 is a diagram illustrating a function of a test data generation device according to a modified example.
Figure 20:
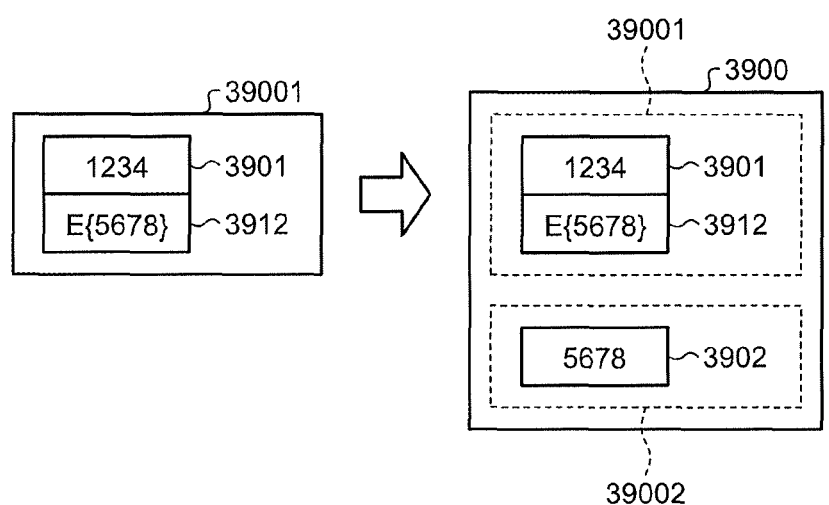
FIG. 20 is a diagram for describing a method of generating template data according to the modified example.

For example, the test data generation device 300 may further include a template data generator 3080 as illustrated in FIG. 19. The template data generator 3080 calculates internal data based on corrected data and generates template data. It is possible to generate the factor 3902 indicating a value of "5678" (the factor indicating the value before being encrypted) and to generate the template data 3900 by performing inverse transform (for example, decoding) with respect to a value E{5678} of the factor 3912 of the corrected data 39001 as illustrated in FIG. 20.

In the above-described third embodiment, the correction process is the encryption, but may be another processing. For example, any processing such as compression and BASE64 encoding may be performed instead of the encryption. In addition, the correction process is not necessarily the invertible transformation process. For example, the correction process may be any process using hash, checksum or CMAC (cipher-based message authentication code) or an arbitrary process of performing calculation based on a value of a factor such as a process of calculating a length of another factor. Incidentally, it is difficult for the template data generator 3080 illustrated in the above-described modified example to generate the template data when the correction process is not the invertible transformation, and thus, it is necessary to directly supply the template data to the test data generation device 300. In addition, the corrected data and the internal data are handled as the integrated template data and the part excluding the internal data is extracted at the end in the above-described third embodiment, but the corrected data and the internal data may be separately handled, and a process of storing only a replaced data part, obtained by replacing the corrected data, as the test data may be performed.

Fourth Embodiment

In the present embodiment, when any factor among a plurality of factors, which have a dependency relationship with each other, serves as both a rewriting part and a correction part, a correction process is not executed for the factor, which is different from the above-described first embodiment. Incidentally, description of common parts as those of the above-described first embodiment will be suitably omitted.

Figure 21:
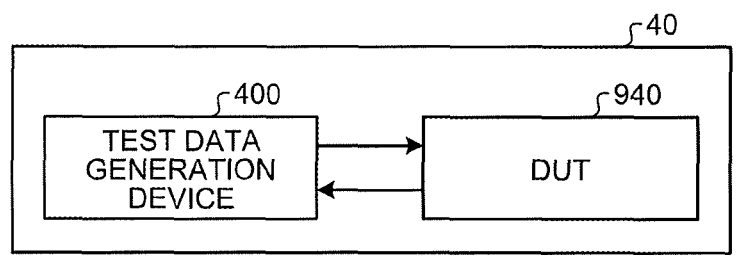
FIG. 21 is a diagram illustrating an example of a configuration of an information processing system according to a fourth embodiment.

FIG. 21 is a diagram illustrating an example of a configuration of an information processing system 40 according to the present embodiment. As illustrated in FIG. 21, the information processing system 40 includes a test data generation device 400 and a DUT 940.

FIG. 22 is a diagram illustrating an example of a function of the test data generation device 400. As illustrated in FIG. 22, the test data generation device 400 includes the normal data storage 1010, the rewriting part determiner 1020, the rewriter 1030, a determiner 4040, a corrector 4050, the test data storage 1060, and an operation dependency relationship storage 4070.

The operation dependency relationship storage 4070 stores one or a plurality of operation dependency relationships. The operation dependency relationship is information which indicates that a value of a certain factor inside data is obtained by operation based on a value of another factor.

When any factor among the plurality of factors, which have the dependency relationship with each other, serves as both the rewriting part and the correction part, the determiner 4040 according to the present embodiment determines not to execute the correction process for the factor. In this example, the determiner 4040 determines a correction method based on the operation dependency relationship, the rewriting part, and the correction part, generates correction information, which indicates a part to be corrected, an operation method to be used for correction or the like, and sends the generated correction information to the corrector 4050.

The corrector 4050 performs the correction with respect to rewritten data received from the rewriter 1030 based on the correction information received from the determiner 4040. For example, when the correction information instructs correction of a value of a factor B by performing an operation C on a value of a factor A, the corrector 4050 generates corrected data by reading the value of the factor A of the rewritten data, performing the operation C with respect to the read value and storing the result value in the factor B. In this example, the corrector 4050 causes the corrected data to be stored as test data in the test data storage 1060, which is similar to the above-described first embodiment. The test data generation device 400 sends the test data stored in the test data storage 1060 to the DUT 940, thereby executing a test.

FIG. 23 is a diagram illustrating an example of the operation dependency relationship, and FIG. 24 is a diagram illustrating an example of normal data 4900. The normal data 4900 is data including a factor 4901, a factor 4902, a factor 4903, and a factor 4904. Hereinafter, a description will be given by attaching each name of "A", "B", "C" and "D" to each of the factor 4901, the factor 4902, the factor 4903, and the factor 4904 in order to identify the respective factors.

In addition, the operation dependency relationship is the information which is represented by a set of three elements (a dependency source factor, a dependency destination factor, and an operation method). The dependency source factor is a factor storing a value serving as a source of the operation, and the dependency destination factor is a factor storing a value serving as a result of the operation. The operation method is information which designates a method of calculating the value of the dependency destination factor from the value of the dependency source factor. An operation dependency relationship 4800 illustrated in FIG. 23 is configured of (B, C, E{ }) and (C, D, H{ }). This instructs to store a value, obtained by operating the value of the factor B using an operation method E{ }, in a factor C and to store a value, obtained by further operating the value using an operation H{ }, in a factor D in the correction process. Herein, the operation method E{ } is encryption, and H{ } is a hash function.

Figure 25:
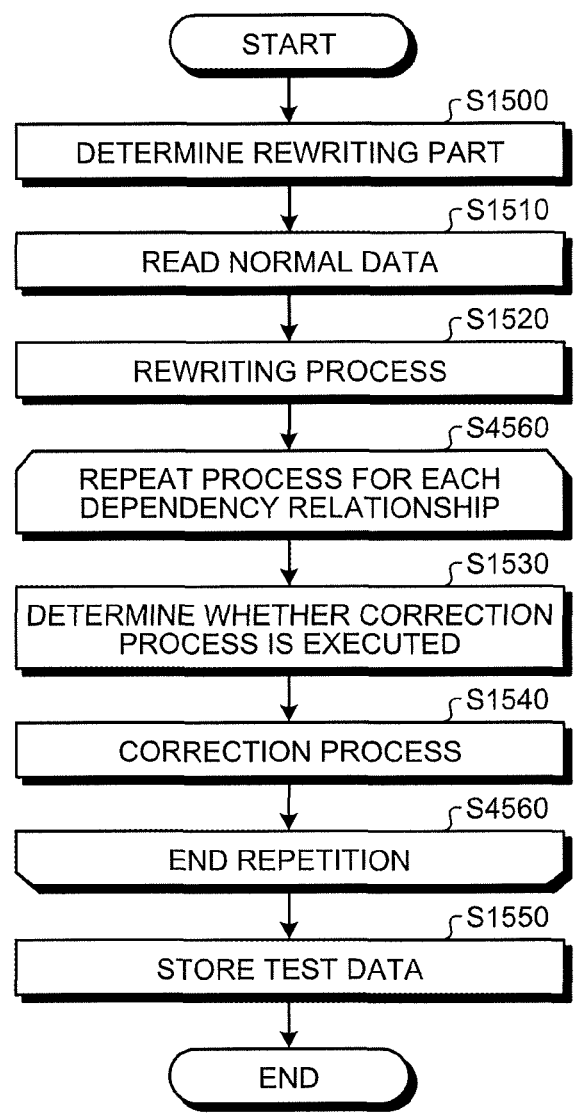
FIG. 25 is a diagram illustrating an operational example of the test data generation device according to the fourth embodiment.

FIG. 25 is a flowchart illustrating an operational example of the test data generation device 400 in the case of generating the test data. A difference from the above-described first embodiment is to repetitively perform the processes of Step S1530 and Step S1540 (a data correction process) for each dependency relationship (Step S4560). Here, the data correction process is performed in the order of the dependency relationship. For example, when the dependency relationships are provided in the order of B→C→D, correction of B→C is first performed, and subsequently, correction of C→D is performed.

Next, the repetitive processing of the data correction process performed in Step S4560 described above will be described in detail with reference to FIG. 26. The same description which has been given with reference to FIGS. 23 and 24 is applied to the operation dependency relationship 4800 and the normal data 4900.

Figure 26:
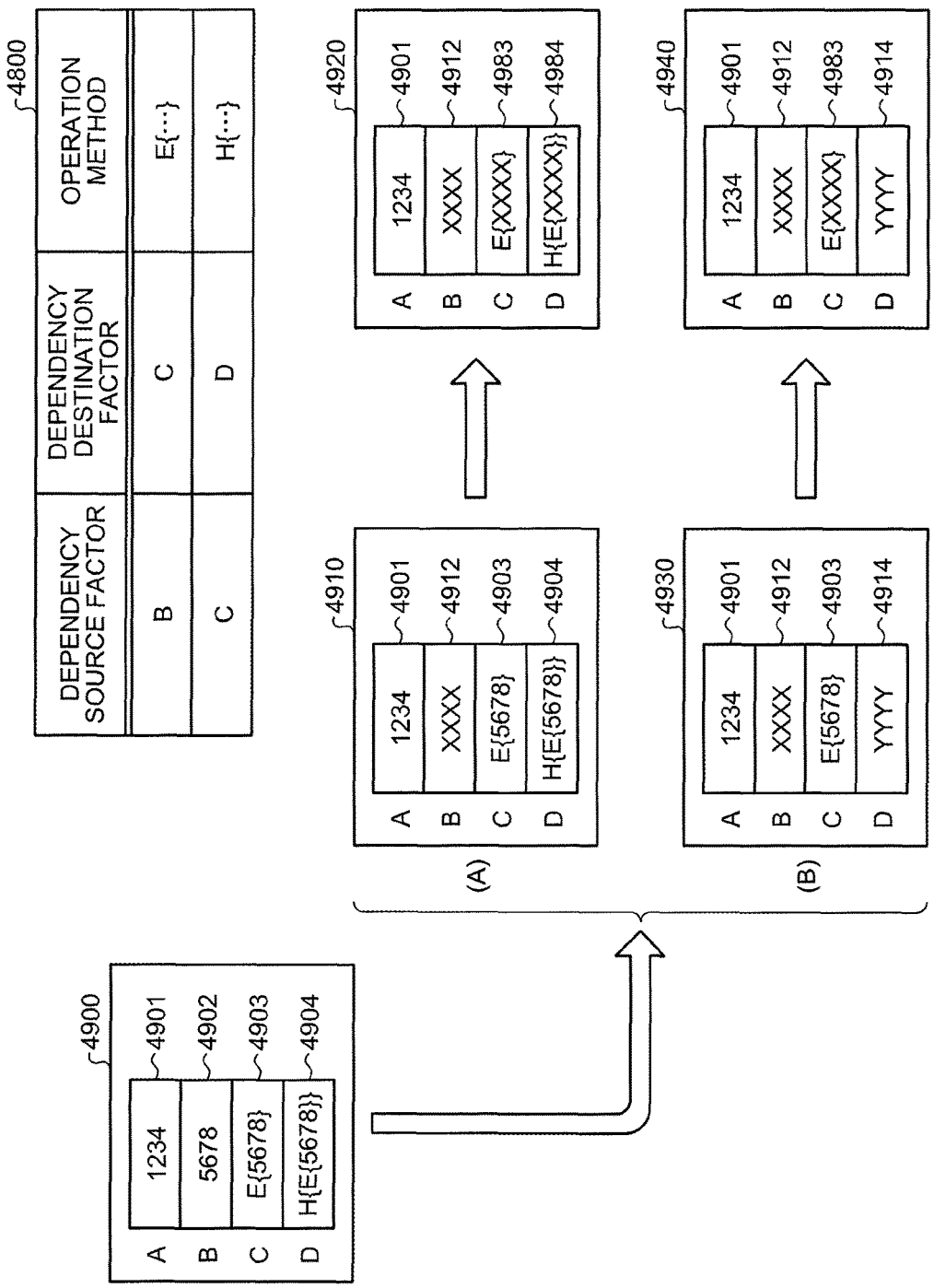
FIG. 26 is a diagram for describing a data correction process according to the fourth embodiment.

Rewritten data 4910 illustrated in FIG. 26 is data which is obtained by rewriting the value of the factor B from 5678 into XXXX based on the normal data 4900. The determiner 4040 instructs correction of the factors C and D based on the operation dependency relationship 4800. The corrector 4050 calculates E{XXXX} from XXXX, and further calculates H{E{XXXX}} from E{XXXX}, corrects the respective factors C and D, and obtains test data 4920.

In addition, rewritten data 4930 illustrated in FIG. 26 is data which is obtained by rewriting the value of the factor B from 5678 into XXXX based on the normal data 4900 and rewriting a value of the factor D from H{E{5678}} into YYYY. The determiner 4040 instructs the correction of only the factor C based on the operation dependency relationship 4800 considering that the factor D has been rewritten. The corrector 4050 calculates E{XXXX} from XXXX, corrects the factor C, and obtains test data 4940.

When any factor among the plurality of factors, which have the dependency relationship with each other, serves as both the rewriting part and the correction part, the test data generation device 400 according to the present embodiment does not execute the correction process for the factor. Accordingly, it is possible to avoid disappearance of an effect of the rewriting process due to the correction process, and thus, there is an advantage that it is possible to suitably test the DUT 940, which is similar to the above-described first embodiment.

Modified Example of Fourth Embodiment

The description has been given in the above-described fourth embodiment regarding the case in which each of the dependency source factor and the dependency destination factor is only one, but the dependency source factor, for example, may include a plurality of sets of factors without being limited thereto. In addition, the name of the factor is used as the information of the dependency source factor and the dependency destination factor for the description of the operation dependency relationship information in the above-described fourth embodiment, but any information may be used as long as a method of identifying the factor. For example, information which designates a position and a length of a factor, that is, a set of an offset position of the factor counted from a data head and the length of the factor may be used.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

In addition, it may be configured such that the program executed by the information processing system according to the respective embodiments and modified examples described above is stored in a computer connected to the network such as the Internet and is provided through download via the network. In addition, it may be configured such that the program executed by the information processing system according to the respective embodiments and modified examples described above is provided or distributed via the network such as the Internet. In addition, it may be configured such that the program executed by the information processing system according to the respective embodiments and modified examples described above is provided in the state of being incorporated in a computer-readable recording medium, which may be provided as a computer program product, such as a ROM in advance.

Further, the respective embodiments and modified examples described above can be combined in an arbitrary manner.

What is claimed is:

1. An information processing device comprising:
a micro-processor configured to:
execute a rewriting process to rewrite some of a plurality of factors, included in data for operation of a target device, into a different value;
execute a correction process that is different from the rewriting process, the correction process being a process of correcting at least part of the plurality of factors depending on a result of calculation that uses values of one or more factors including a factor rewritten by the rewriting process; and
determine a method of generating the test data based on a rewriting part that indicates a factor serving as a target of the rewriting process and based on a correction part that indicates a factor serving as a target of the correction process,
wherein the micro-processor determines not to execute the correction process for a factor serving as both the rewriting part and the correction part.

2. The device according to claim 1, wherein the correction process is a process of performing:
invertible transformation including encryption and/or compression, or
a calculation for a hash function, a checksum, a cipher-based message authentication code (CMAC), or a length of another factor.

3. The device according to claim 1, wherein the correction process is a process of modifying communication information to be used for communication with the target device.

4. An information processing device comprising:
a micro-processor configured to:
execute a rewriting process to rewrite some of a plurality of factors, included in data for operation of a target device, into a different value;
execute a correction process that is different from the rewriting process, the correction process being a process of correcting at least part of the plurality of factors depending on a result of calculation that uses values of one or more factors including a factor rewritten by the rewriting process; and
determine a method of generating the test data based on a rewriting part that indicates a factor serving as a target of the rewriting process and based on a correction part that indicates a factor serving as a target of the correction process,
wherein the micro-processor determines generation of two kinds of the test data when a factor serving as both the rewriting part and the correction part is present.

5. The device according to claim 4, wherein the micro-processor determines generation of first test data and second test data as the two kinds of the test data, the first test data being obtained by executing the correction process after executing the rewriting process with respect to the data, the second test data being obtained by executing the rewriting process after executing the correction process with respect to the data.

6. The device according to claim 4, wherein the correction process is a process of performing:
invertible transformation including encryption and/or compression, or
a calculation for a hash function, a checksum, a cipher-based message authentication code (CMAC), or a length of another factor.

7. An information processing device comprising:
a micro-processor configured to:
execute a rewriting process to rewrite some of a plurality of factors, included in data for operation of a target device, into a different value;
execute a correction process that is different from the rewriting process, the correction process being a process of correcting at least part of the plurality of factors depending on a result of calculation that uses values of one or more factors including a factor rewritten by the rewriting process; and
determine a method of generating the test data based on a rewriting part that indicates a factor serving as a target of the rewriting process and based on a correction part that indicates a factor serving as a target of the correction process,
wherein
the data includes:
corrected data that is obtained by executing the correction process with respect to some factors among the plurality of factors included in predetermined data, and
an uncorrected factor that is a factor before being corrected, and
the micro-processor determines generation of the test data based on replaced data when the uncorrected factor is the rewriting part, the replaced data being obtained by replacing a factor corresponding to the uncorrected factor among factors included in the corrected data with a replacement factor obtained by executing the correction process after executing the rewriting process with respect to the uncorrected factor.

8. The device according to claim 1, wherein when any factor among a plurality of factors that have a dependency relationship with each other serves as both the rewriting part and the correction part, the micro-processor determines not to execute the correction process for the factor.

9. A computer implemented information processing method comprising:
executing a rewriting process to rewrite some of a plurality of factors, included in data for operation of a target device, into a different value;
executing a correction process that is different from the rewriting process, the correction process being a process of correcting at least part of the plurality of factors depending on a result of calculation that uses values of one or more factors including a factor rewritten by the rewriting process; and
determining a method of generating the test data based on a rewriting part that indicates a factor serving as a target of the rewriting process and based on a correction part that indicates a factor serving as a target of the correction process,
wherein the determining is performed by determining not to execute the correction process for a factor serving as both the rewriting part and the correction part.

10. A computer program product comprising a non-transitory computer-readable recording medium containing a program, wherein the program, when executed by a computer, causes the computer to execute:
executing a rewriting process to rewrite some of a plurality of factors, included in data for operation of a target device, into a different value;
executing a correction process that is different from the rewriting process, the correction process being a process of correcting at least part of the plurality of factors depending on a result of calculation that uses values of one or more factors including a factor rewritten by the rewriting process; and determining a method of generating the test data based on a rewriting part that indicates a factor serving as a target of the rewriting process and based on a correction part that indicates a factor serving as a target of the correction process, wherein the determining is performed by determining not to execute the correction process for a factor serving as both the rewriting part and the correction part.

11. The device according to claim 7, wherein the correction process is a process of performing:

invertible transformation including encryption and/or compression, or a calculation for a hash function, a checksum, a cipher-based message authentication code (CMAC), or a length of another factor.

* * * * *